Sept. 9, 1952   H. A. BLEAM ET AL   2,609,778
SOLDERING IRON

Filed June 29, 1949   2 SHEETS—SHEET 1

INVENTORS
HOWARD A. BLEAM
FRED SINGLEMAN
DOUGLAS MILLER
BY J. V. Douglas
their atty.

Sept. 9, 1952  H. A. BLEAM ET AL  2,609,778
SOLDERING IRON

Filed June 29, 1949  2 SHEETS—SHEET 2

INVENTORS
HOWARD A. BLEAM
FRED SINGLEMAN
DOUGLAS MILLER
BY J. V. Douglas
their atty.

Patented Sept. 9, 1952

2,609,778

UNITED STATES PATENT OFFICE 2,609,778

SOLDERING IRON

Howard A. Bleam, Fred Singleman, and Douglas Miller, Chicago, Ill., assignors to Admiral Corporation, Chicago, Ill., a corporation of Delaware Application June 29, 1949, Serial No. 101,956

5 Claims. (Cl. 113—105)

This invention relates to soldering irons, and more particularly to a soldering iron to be used for disconnecting soldered joints and leaving them clear of excess solder.

At times it is desirable, particularly in radio work, to disconnect soldered joints. In order to do this, it is common to melt the solder and separate the previously joined parts. The most common parts which are joined are a wire and a terminal lug. When such parts are disconnected, the solder formerly used to hold them together frequently collects in a ball on the lug, on the wire or else falls off into the radio where it is not wanted.

Our invention provides a means for removing this undesired solder from the joined parts and leaving them clear and free of excess solder, leaving only a tinned surface. The solder may also be transported to some place where it will not be objectionable. In addition to the cleaning action, our invention by its operation cools the joint somewhat to allow handling sooner after disassembly than has heretofore been possible.

Figure 1:
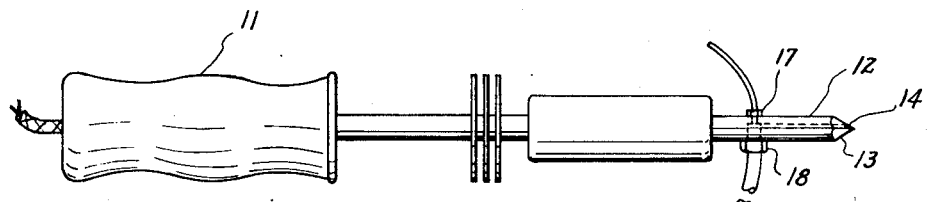
Fig. 1 is a view showing one embodiment of my invention.

Referring now to the drawings, throughout which like reference characters designate like parts, our invention comprises briefly a soldering iron having an opening in the tip thereof and a means for creating a reduced pressure in this opening to suck the surrounding air therethrough, which air will then carry excess melted solder into the tip and away from the joint being disassembled.

More specifically, our invention comprises a soldering iron having the usual handle 11 and a tip 12. Our invention is applicable to either electrically heated or externally heated irons and the illustration of the electrically heated iron is not to be construed as a limitation of our invention to that application.

The tip 12 of the iron may be formed, in the usual manner, of copper or the like having a pyramidal point 13. At or near the point 13 a small hole 14 extends into the tip. In the preferred embodiment, a second hole 15 extends transversely through the tip and intersects the small hole 14 at a right angle. A jet 16 is directed into the hole 15 forming an ejector or aspirator within the tip 12 which will cause a region of low pressure at the juncture of the intersecting holes 14 and 15 upon a jet of air being forced through the hole 15. A connection 17 is made to the jet 16 to provide for the passage through the jet 16 of this compressed air. A connection 18 is also made at the hole 15 to carry away the air and entrained solder.

In operation, our device is particularly adapted to the disconnection of previously soldered joints. In order to accomplish this, the iron is heated by the usual method and applied to the soldered joint. The solder will melt and at this time a blast of compressed air is introduced through the connection 17 to the jet 16. By reason of the velocity of the air, the pressure within the tip becomes less than atmospheric pressure, and the air around the point 13 will be drawn into the hole 14 carrying with it the molten solder left on the joint and ejecting it from the outlet of the second hole 15. A tube 19 leading away from the hole 15 may be provided to carry the solder away from the tip 12 and into a filter bag 20. This bag is preferably made of a heat resistant porous substance such as asbestos. The rush of air over the joint into the small hole 14 will also serve to cool the pieces formerly joined and enable them to be handled sooner after disconnection than was previously possible. It is apparent that the device may also be used to remove excess solder from a newly formed joint or to cool the new joint in much the same manner.

Figure 2:
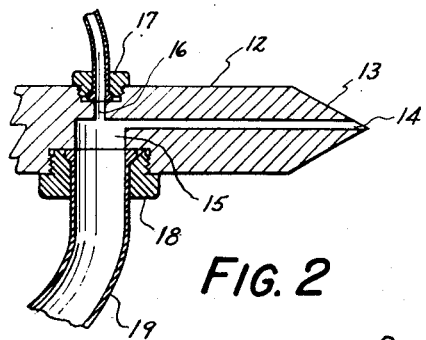
Fig. 2 is an enlarged sectional view of the tip of the iron.
Figure 3:
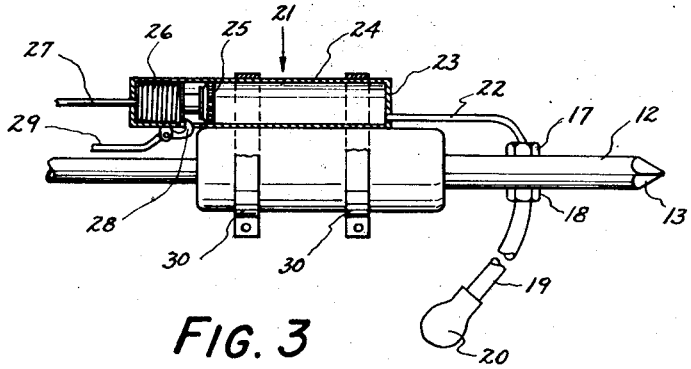
Fig. 3 is a view showing an alternative embodiment of my invention being completely free of external pressure lines.

It is also conceived that a portable source of pressure may be used with the embodiment of Fig. 1. This is shown in Fig. 3 which shows the same iron having a tip in all respects the same as that shown in Fig. 2. An air pump 21 is carried on the iron and is connected by a tube 22 from the pressure end 23 of the cylinder 24 of the pump to the connection 17. The piston 25 is spring loaded by a compression spring 26 around the piston rod 27 which tends to force the piston towards the end 23 of the cylinder. A latch arrangement of any convenient type, shown diagrammatically at 28 holds the piston in a cocked position against the force of the spring 26. A trigger 29 for the latch 28 is arranged to be released by the operator of the iron whenever he desires to remove the solder which has been melted. This may be a construction similar to the common toy air gun.

It is conceived that the pump 21 may be made readily removable from the iron by providing clips 30 by which the pump may be clipped onto the iron. The tube 22 may then be flexible and have an easily connected screw type tube fitting at its end. This arrangement would permit the convenient use of the same iron for soldering or undoing soldered joints, and when there is no likelihood of having to break a soldered connection, the pump and its accessories could be easily removed.

Figure 4:
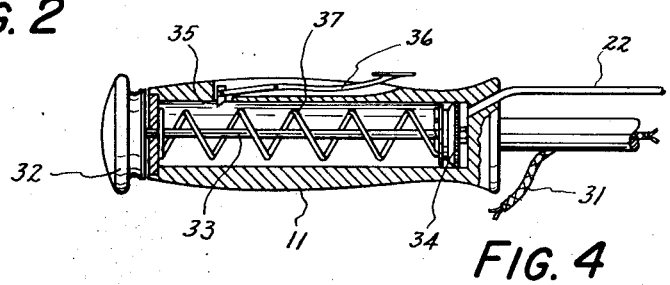
Fig. 4 is a view of a second alternative embodiment.

A permanent installation of this type of device is illustrated in Fig. 4 where the pump is enclosed in and integral with the handle 11 of the iron. In an embodiment such as this, the electric cord 31 of an electric iron may have to extend from the side of the stem of the iron instead of through the handle as is customary, although it could be enlarged to receive the cord alongside the chamber. In this embodiment, it is preferred to have the cocking handle 32 and piston rod 33 which is fixed to the handle 32, free of the piston 34. The piston could then be cocked until the flange 341 is caught by the latch 35. The handle 33 would then be pushed back in where it could be held by any customary type of detent, not shown, the piston being reciprocable on and guided by the rod 33. Then upon release of the latch 35, by the lever 36, the piston 34 would be forced quickly to the end of the cylinder by the spring 37, thus forcing air through the tube 22 in a manner the same as previously described.

Figure 5:
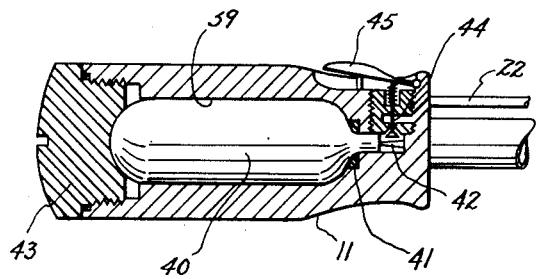
Fig. 5 is a view of another embodiment having a different type of portable pressure source.

Another embodiment which is portable and self contained is shown in Fig. 5. The tip is the same as that of the previously described embodiment, and a tube 22 is similarly connected thereto. In the handle 11, however, is a chamber 39 adapted to receive a small cylinder 40 of compressed carbon dioxide such as is used for carbonation of water in seltzer bottles. The chamber 39 is provided with a sealing gasket 41 at the neck of the cylinder 40 and has a perforating point 42 adapted to break the seal at the neck of the cylinder when the cylinder is forced into the chamber 39 by screwing the cap 43 into the handle. A valve 44, which is shown as a spring loaded poppet type valve but need not be such, is provided which will control the flow of the gas from the cylinder. A trigger lever 45 is provided in the handle 11 of the iron adapted to be controlled by the thumb or forefinger of the operator.

Figure 6:
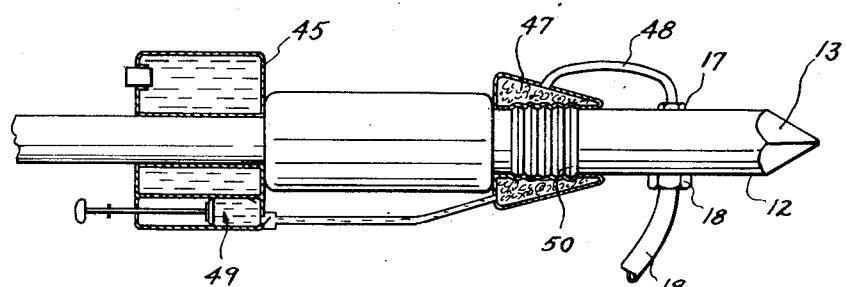
Fig. 6 is a view of an embodiment using a different pressure supply.

Still another alternative has been conceived. This latter embodiment (Fig. 6) utilizes steam pressure to provide the high velocity stream in the ejector so that air from about the tip will be drawn in. The steam is provided by forcing a small amount of water to flow from a small container 45 into a "flash boiler" 47 where it is vaporized immediately and because of the sudden expansion is forced through the tube 48 to the jet where its action is the same as though air were being forced rapidly through the jet. The charging of the boiler is accomplished by means of a small pump 49 formed in the container. It will readily be seen that the pump will force a small stream of water into the boiler 47 against the hot corrugations or threads 50 thereof, causing an immediate generation of steam which can escape only through the tube 48 and therefore through the jet. The boiler is preferably made of a high heat conductive metal such as copper. Being a portable instrument, it can be held in any position other than that shown. For instance, it may be desirable to hold it so that the water is supplied from the top side rather than the bottom. The illustration shows the entrance tube bent so that the stream of water is directed toward the corrugations, however.

Figure 7:
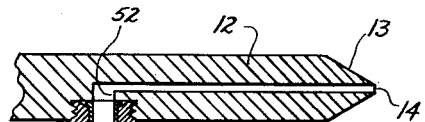
Fig. 7 is a view of another alternative embodiment using an external pressure source.

The alternative embodiment shown in Fig. 7 comprises a similar tip 12 having a point 13. A hole 14 extends from the point 13 through the tip 12 and connects with another perpendicular hole 52 in the tip as in the first embodiment but forms a continuous channel with the hole 14 from the point 13. A connection 53 for a tube 54 is provided at this hole 52, and the tube 54 extends therefrom to the upright of a connection 55 of approximately T shape. The compressed air connection leads to the cross piece of the T at 56. The action of this device is similar to that first described, the difference being that the ejector is outside the tip, and therefore the solder will probably be cooled somewhat in traveling through the tube 54. A filter bag 20 may also be provided for this embodiment.

Figure 8:
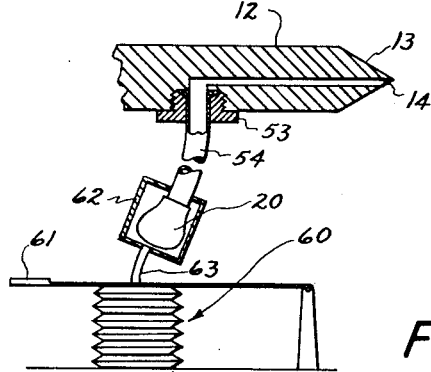
Fig. 8 is a similar view of an embodiment using a vacuum rather than pressure.

Still another embodiment using an external source of vacuum is shown in Fig. 8 where the tip 12 of the iron is formed similarly to that of Fig. 7. The vacuum forming device may be a water powered eduction device of which many are well known, or it may be a foot powered device such as is shown. A bellows device 60 is shown diagrammatically to illustrate another possible method of obtaining the necessary vacuum. In the illustrated embodiment, the operator would keep his foot pressed on the pedal 61 until it was desired to clear the joint of solder. Upon release of the pedal, a spring within the bellows 60 forces the bellows up creating a decreased pressure in the chamber 62 to which it is connected by a tube 63. This chamber houses the filter bag 20 and is tightly sealed about the tube 54 and 63. Therefore, a low pressure is created in the hole 14 and air rushes thereinto carrying solder as before.

It will be readily apparent that the bellows 60 could readily be replaced by a pump arrangement.

Figure 9:
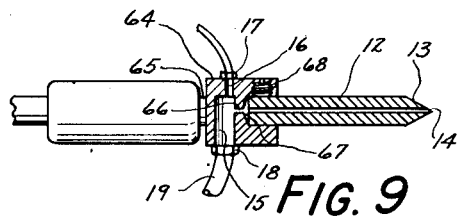
Fig. 9 is a view of a replaceable tip for my invention.

An embodiment of our invention having a separated tip and ejector unit is shown in Fig. 9. This embodiment is similar in action to that of Figs. 1 and 2, the difference lying in the formation of the tip. An ejector piece 64 having a stem 65 is inserted into the iron heating element. This piece has the ejector formed in it similar to the first embodiment. The low pressure hole 66, however, leads to a chamber 67 of proper size to receive the tip 12. The small hole 14 extends completely through this tip 12, and when the tip is in place in the chamber 67, the hole 14 communicates with hole 66. The tip 12 is held in the chamber 67 by a set screw 68. It is apparent that the action of this device is similar to that of the first embodiment with the advantage that if the tip needs replacement, the ejector piece may be retained, thus making replacements much less expensive.

It is thus apparent that we have provided a means for cleaning the solder from a soldered joint by causing a stream of air to entrain the solder and carry it through the tip of the iron.

Having thus described our invention, we are aware that numerous and extensive departures may be made therefrom without departing from the spirit or scope of our invention.

We claim:

1. In a soldering iron, a tip having a point and formed to provide a passageway leading into said tip from near said point, a larger passageway intersecting said first named passageway, and a jet passageway opening into said larger passageway and substantially in line therewith, and a source of gas pressure connected to said jet passageway whereby said passages are adapted to act as an aspirator to draw air and entrained molten solder through the passageway from near said point.

2. The apparatus of claim 1 in which said source of pressure is portable and fixed to said soldering iron.

3. The apparatus of claim 2 in which the source of pressure is a pump means having a spring loaded plunger, and means on said pump means engageable with said plunger for quick release thereof.

4. The apparatus of claim 1 in which the source of pressure is a chamber of compressed gas inserted in the handle of said iron, tube means leading from said chamber to said jet passageway and valve means between said chamber and said jet passageway for controlling the flow of said gas to said jet.

5. The apparatus of claim 1 in which the source of pressure is a pump disposed in the handle of said iron and having a spring loaded plunger, tube means connected between said pump and said jet passageway, and latch means engaging said plunger adapted to release said plunger for quick spring pressed movement thereof.

HOWARD A. BLEAM.
FRED SINGLEMAN.
DOUGLAS MILLER.

REFERENCES CITED

The following references are of record in the file of this patent:

UNITED STATES PATENTS

| Number | Name | Date |
|---|---|---|
| 81,060 | Ashcroft | Aug. 18, 1868 |
| 842,100 | Von Lindenstamm | Jan. 22, 1907 |
| 1,067,802 | Dana | July 22, 1913 |
| 1,609,844 | Swanson | Dec. 7, 1926 |
| 1,721,951 | Gould | July 23, 1929 |
| 1,928,129 | Hornack | Sept. 26, 1933 |
| 1,929,666 | Williams | Oct. 10, 1933 |
| 1,938,330 | Hall | Dec. 5, 1933 |
| 1,957,325 | Davis | May 1, 1934 |
| 1,981,570 | Price | Nov. 20, 1934 |
| 2,184,980 | Smith | Dec. 26, 1939 |
| 2,300,765 | Barnhart | Nov. 3, 1942 |
| 2,452,360 | Dunham | Oct. 26, 1948 |
| 2,515,097 | Schryber | July 11, 1950 |

FOREIGN PATENTS

| Number | Country | Date |
|---|---|---|
| 181,042 | Great Britain | June 15, 1922 |
| 231,303 | Germany | July 26, 1908 |